United States Patent Office 2,956,457
Patented Oct. 18, 1960

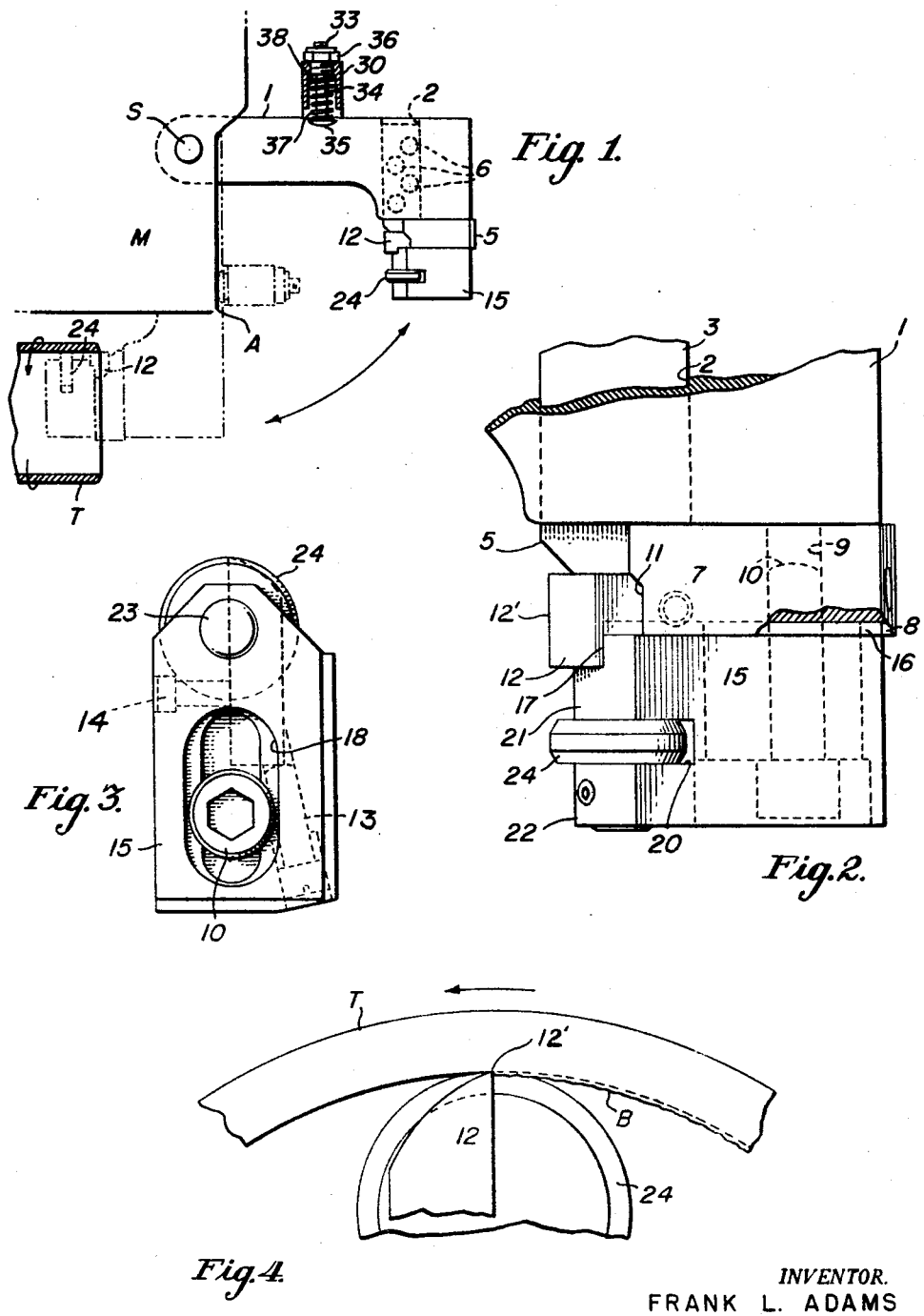

2,956,457

REAMING TOOL FOR LARGE DIAMETER TUBES

Frank L. Adams, Hammond, Ind., assignor to Youngstown Sheet and Tube Company, Youngstown, Ohio, a corporation of Ohio Filed July 15, 1959, Ser. No. 827,187

2 Claims. (Cl. 77—73)

The present invention relates to a reamer for tubes and pipes herein generically termed tubes, for example seamless steel tubes which after forming have somewhat rough and uneven ends subsequently removed by cutting-off mechanism leaving machined extremities defining annular surfaces normal to the tube axis.

Most such cutting-off machines, exemplified by automatic cutoff lathe No. 39 marketed by Bardons & Oliver, Inc., Cleveland, Ohio, remove the end of the tube by traversing radially inwardly of its wall while the tube is being rotated about its axis one or a plurality of cutting-off tools which form a reasonably smooth annular surface on the tube end but usually leave at the inside edge of that surface a relatively small annular burr extending inwardly to an inside diameter appreciably less than the remainder of the tube and which it is customary to remove. This deburring or reaming in small tubes is often accomplished by entering a tapered reaming tool in the tube bore and rotating it therein but in large diameter tubes it is more usual to employ a cutting tool appropriately disposed to attack the burr. But as it is substantially impossible to produce tubes, particularly large diameter seamless steel ones, of wall thickness precisely uniform throughout the tube circumference and exact concentricity between the inner and outer surfaces such tools sometimes take locally too deep a cut, thereby endangering the integrity of the tool at some sectors of the tube and at others too light a one to entirely remove the internal burr.

I have found that by utilizing the inner wall surface of a tube adjacent its burred end as a guide and advancing a cutting tool under yielding pressure into the work compensation for non-uniform wall thickness in the tube can be attained in such manner as to remove from the tube end all, but not more than all, the burr projecting radially inward from the tube inner wall surface without risk of damaging either the tube or the cutting tool by cutting too deeply at sectors of excessive wall thickness or failing to remove all of the burr at others, with improvement in the quality of the work and prolongation of the useful life of the cutting tools.

It is therefore a principal object of the invention to provide an improved reaming tool adapted for association with a tube cutoff machine and operable to remove internal burrs from tube ends to thereby conform the inner edge of the tube end face precisely with the contiguous inner wall surface of the tube.

A further object is to provide a tube reamer comprising guide means for engaging the inner wall of a tube to be reamed and positioned relatively to the cutting tool edge in such manner as to prevent the latter from attacking the tube radially outwardly beyond longitudinal alignment with its adjacent inner wall surface.

Other objects, purposes and advantages of the invention will hereafter appear or be understood from the following description of a preferred embodiment of it illustrated in the accompanying drawing in which:

Fig. 1 is a side elevation of a reamer unit embodying the invention in association with a diagrammatic fragmentarily illustrated cutoff machine of a usual type in conjunction with which the unit may be advantageously operated;

Fig. 2 is an enlarged side elevation of the reamer unit removed from the machine;

Fig. 3 is an end view of the unit, and

Fig. 4 is a fragmentary greatly enlarged diagrammatic end elevation of a tube showing the tube engaging elements of the unit in operative relation to the tube during removal of an internal burr from the end thereof.

Referring now more particularly to the drawing it will be understood the cutoff machine M fragmentarily indicated in Fig. 1 may be a Bardons & Oliver, Inc. No. 39 cutoff lathe or any other suitable machine adapted to receive a tube T for rotation about its own axis and including a rotatable shaft S having a pneumatic cylinder or other suitable yielding means (not shown) for oscillating it about its axis to thereby swing an arm 1, keyed to the shaft, between its inoperative position, indicated in full lines in Fig. 1, and its operative one indicated therein in broken lines, the means for controlling the shaft actuating mechanism being automatic or manual as preferred but constituting no part of the invention.

The arm 1 swingable as indicated in a vertical plane substantially coincident with the axis of tube T when operatively received in a rotatable chuck forming part of the cutoff machine M, is provided at its outer extremity with a rectangular socket or hole 2 adapted to receive the complementary shank 3 of a reamer holder generally designated 5, locking screws 6 threaded into the arm removeably securing the shank in the socket. The holder 5, roughly L-shaped, is provided in its depending leg 7 with ways 8 and an internally threaded bore 9 for reception of a lock screw 10 as well as with a recess 11 receiving a cutter 12 seating against an adjusting screw 13 threaded into the leg to project angularly into the recess, while a set screw 14 also threaded into the holder to bear against the face of the cutter assists in securement of the latter in the holder. Associated with the leg 7 is a roller block 15 provided with a tongue 16 slidable in ways 8, a partial recess 17 cooperative with recess 11 to receive the cutting tool, and a countersunk slot and bore 18 for passage of lock screw 10 providing by its countersink an abutment for the head of the latter to secure the block to the reamer holder. The block also provides a transverse open slot 20 between bosses 21, 22 which support a spindle 23 carrying a freely rotatable roller 24, these parts being assembled to position the cutting edge 12' of tool 12 parallel to the axis of a cylinder tangent to the radially external surface of roller 24 and coincident with the line of tangency therebetween.

To cushion the attack of the cutting tool upon the tube when moved into cutting relation therewith in the manner herein after described the arm is provided with a spring-load bumper mechanism comprising a block 30 suitably secured to the rear face of the arm and projecting laterally therebeyond for reception of the shank 33 of a bumper element 34 the head 35 of which is adapted to engage an abutment A constituting a part of the cutoff machine, shank 33 being threaded to receive a nut 36 for adjusting the tension of a compression spring 37 surrounding the shank and seated in a cylindrical recess 38 in the block.

This reamer unit, when mounted on a cutoff machine such as that indicated in the drawing, can be swung about the axis of shaft S and for initially adjusting the roller and the cutter relatively thereto for reaming a given size tube is brought to the position indicated in broken lines in Fig. 1, with bumper spring 37 compressed to the limit attainable in consideration of the positioning of the bumper in relation to abutment A. With a tube T disposed in the cutoff machine roller 24 is moved to tangential relation to the tube inner wall surface and secured by locking screw 10. Cutter 12 also may be adjusted at this time to contact the said surface but as the tube burr may interfere with this it may be preferable to adjust it to align with the roller when the arm is retracted from the tube. The operating mechanism now may be started, thus rotating tube T about its axis and swinging the reamer unit in toward the pipe end as a result of automatic or manual turning of shaft S and the tool again adjusted to take the desired depth of cut. On contact of the bumper with abutment A this swinging movement is temporarily retarded and as it is desirable the position of the arm attained at such retardation correspond fairly closely to that at which the cutter first attacks the tube burr it will be seen that the depth of cut at this moment is negligible. Immediately upon retardation of the arm movement, however, pressure in the actuating cylinder or other comparable mechanism begins to accumulate, thereby moving the arm relatively gradually against the bias of spring 37 in to its limit position with roller 24 engaging the inner wall of the tube at which tool 12 takes its full cut as the tube rotates through a little more than one complete revolution to assure removal of that portion of the burr initially only partially removed, after which the arm 1 is swung back to clear the tool and roller from the tube.

Normally, in large scale production a succession of virtually identical tubes are chucked substantially similarly in the machine and the cutting off tools remove their ends consecutively leaving their newly finished end surfaces in the same transverse plane and their axes in the same position as those of preceeding and succeeding tubes. Hence once the reamer unit has been properly adjusted for a given size of tube it can operate successively upon a great number of similar ones substantially automatically and without attention, roller 24 assuring that the surface produced by the cutter be uniform and coincident with the adjacent inner wall surface of the tube irrespective of variations in wall thickness, the pressure exerted on the arm maintaining the roller in engagement with the tube wall and preventing backing away of the cutter and hence the taking of too light a cut.

While I have herein illustrated and particularly described one embodiment of the invention it will be understood I do not desire or intend to be thereby limited or confined in any way as changes and modifications in the form, structure, arrangement and relationship of the several constituent elements and parts will readily occur to those skilled in the art and may be made if desired without departing from the spirit and scope of the invention as defined in the appended claims.

Having thus described my invention, I claim and desire to protect by Letters Patent of the United States:

1. A reamer of the character described comprising a swingable arm, a generally L-shaped holder socketed in the arm providing ways and a recess for reception of a cutting tool, a block having a tongue engageable in said ways and a recess cooperative with the holder recess to define a socket for said tool, a roller carried by said block rotatable about an axis parallel with the cutting edge of said tool when seated in said socket and means adjustably securing the block to the holder.

2. In a reamer as defined in claim 1 a spring-pressed bumper carried by the arm adapted to engage an abutment to thereby retard swinging motion of the arm in one direction adjacent a corresponding limit of its travel.

References Cited in the file of this patent

UNITED STATES PATENTS

| | | |
|---|---|---|
| 1,706,512 | Baines | Mar. 26, 1929 |
| 1,980,288 | Olson | Nov. 13, 1934 |
| 2,889,721 | Coleman | June 9, 1959 |

UNITED STATES PATENT OFFICE
CERTIFICATION OF CORRECTION

Patent No. 2,956,457                          October 18, 1960

Frank L. Adams

It is hereby certified that error appears in the above numbered patent requiring correction and that the said Letters Patent should read as corrected below.

In the grant, lines 1, 2 and 3, for "Frank L. Adams, of Hammond, Indiana, assignor to Youngstown Sheet and Tube Company, of Youngstown, Ohio, a corporation of Ohio," read -- Frank L. Adams, of Hammond, Indiana, --; line 12, for "Youngstown Sheet and Tube Company, its successors" read -- Frank L. Adams, his heirs --; in the heading to the printed specification, lines 3, 4 and 5, for "Frank L. Adams, Hammond, Ind., assignor to Youngstown Sheet and Tube Company, Youngstown, Ohio, a corporation of Ohio" read -- Frank L. Adams, 7330 McCook Ave., Hammond, Ind. --.

Signed and sealed this 9th day of May 1961.

(SEAL)
Attest:

ERNEST W. SWIDER
Attesting Officer

DAVID L. LADD
Commissioner of Patents